United States Patent [19]

Koseki

[11] Patent Number: 4,722,086
[45] Date of Patent: Jan. 26, 1988

[54] DEVICE FOR MONITORING DISCHARGE VOLTAGE OF LASER GENERATOR
[75] Inventor: Ryoji Koseki, Buena Park, Calif.
[73] Assignee: Amada Engineering Service Co., Inc., La Mirada, Calif.
[21] Appl. No.: 784,621
[22] Filed: Oct. 4, 1985
[51] Int. Cl.[4] .......................... H01S 3/00; H01S 3/097
[52] U.S. Cl. ........................................ 372/33; 372/38; 372/81
[58] Field of Search .............................. 372/38, 33, 81
[56] References Cited
FOREIGN PATENT DOCUMENTS
0068688 5/1980 Japan ....................... 372/38
0123187 9/1980 Japan ....................... 372/38

Primary Examiner—James W. Davie
Attorney, Agent, or Firm—Wigman & Cohen

[57] ABSTRACT

A device for monitoring the discharge voltage of a laser generator comprising a monitor means which detects, at positive electrodes, voltage differences between neighboring laser tubes. The monitor means may include a first monitor to detect voltage at a positive electrode and a second monitor connected to the first to perform a predetermined operation. In the event of an abnormal discharge, the predetermined operation may be a warning signal or an automatic adjustment in power source voltage.

9 Claims, 5 Drawing Figures

DEVICE FOR MONITORING DISCHARGE VOLTAGE OF LASER GENERATOR

FIELD OF INDUSTRIAL APPLICATION

The present invention relates to a device for monitoring the discharge voltage of a high speed axial flow gas laser generator or oscillator positioned in series between a plurality of lasers.

BACKGROUND OF THE INVENTION

The present invention is related to a previously developed high speed axial flow carbon dioxide gas laser generator or oscillator. A high speed axial flow carbon dioxide gas laser generator or oscillator comprises, a laser generator section supported on a supporting frame, an attachment which adjusts the laser generator section, a main heat exchanger for cooling the laser gas (a mixed gas of carbon dioxide, nitrogen and helium), a gas circulation drive device for circulating the laser gas provided on the top surface of the main heat exchanger 11, and an auxiliary heat exchanger 15 provided on the top section of the gas circulation drive device.

The laser generating section comprises two groups of laser tubes freely movable in micromotion in the lateral direction.

The present invention relates to a device for monitoring the discharge voltage in the shells of the laser tubes.

The laser tubes are formed from a pair of central shells and a pair of end shells respectively. In these shells, positive electrodes and negative electrodes are provided for discharge, and the discharge is performed by an AC power source at the respective locations. The positive electrodes of the neighboring laser tubes (central shells) and (end shells) are connected to the positive sides of each of a plurality of separately provided variable DC power sources and grounded therewith E. The negative electrodes are provided adjacent to a discharge section, and each is respectively connected to the negative side of the DC power source through a ballast resistance.

The laser gas is placed in a state of excitation by a discharge between these pairs of electrodes, and the excitation light passes to a rear mirror, then to a plurality of bend mirrors, and returns to an output mirror. This excitation light is amplified and produces the laser oscillation. One part of this oscillation is directed externally by the output mirror 45 and is used for laser processing.

In the discharge circuit, a plurality of discharge voltage monitors monitor the voltage at the negative electrodes through a plurality of detector resistances in order to monitor the discharge status of each of the laser tubes. This type of discharge voltage monitor is provided because the electrical resistances between the two negative electrodes of the laser tubes differ in the respective laser tubes, and when the difference in electric potential becomes large, a discharge is produced between the two negative electrodes so that the laser oscillation becomes unstable, causing the output to drop, which must be prevented.

This discharge voltage monitoring device detects and indicates the negative electrode voltage of each of the laser tubes respectively. When the difference between these voltages is large, a specified operation is carried out, either by an operator, or automatically. However, when a discharge is produced between two negative electrodes for example, the electric potential between the two negative electrodes will change to become smaller. In such a case, it is not possible to conclude from the monitor indication that there is an abnormality. Accordingly, this discharge voltage monitoring device will not necessarily indicate clearly the discharge status of the laser tube.

SUMMARY OF THE INVENTION

The present invention, with due consideration of the above-mentioned problems, has the objective of providing a device for monitoring the discharge voltage of a laser generator, making it possible to detect the voltage of the positive electrode of each laser tube and thus more accurately detect and monitor the abnormal discharge between adjacent negative electrodes from the difference in voltage between these positive electrodes, thereby controlling the status of the discharge.

Other and further objects and advantages of the present invention will be apparent from the following description and accompanying drawings which, by way of illustration, show preferred embodiments of the present invention and the principles thereof.

DETAILED DESCRIPTION OF PREFERRED EMBODIMENTS

Figure 1:
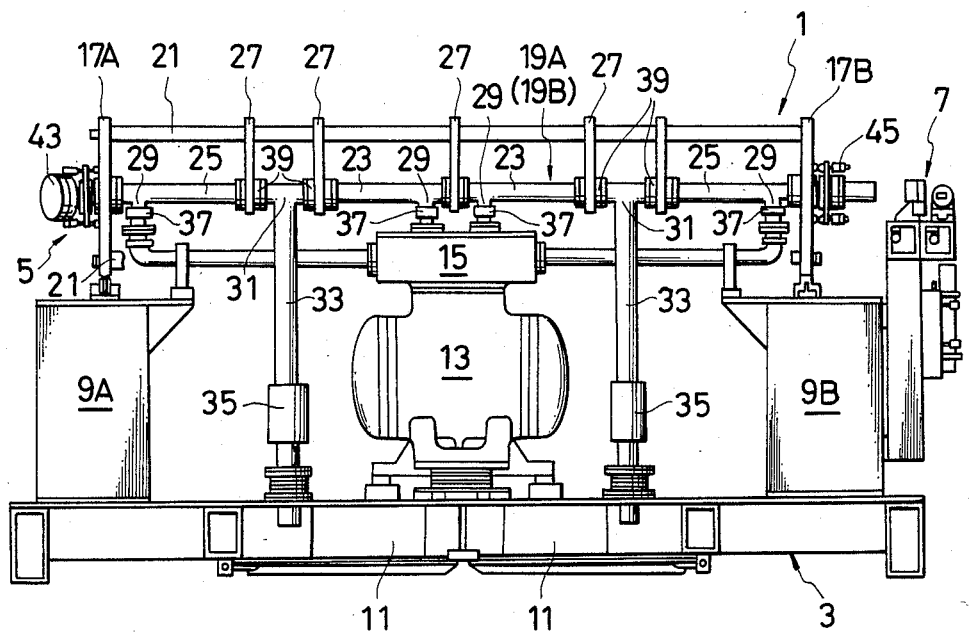
FIG. 1 is a front elevation view of the previously developed high speed axial flow carbon dioxide gas laser generator.
Figure 2:
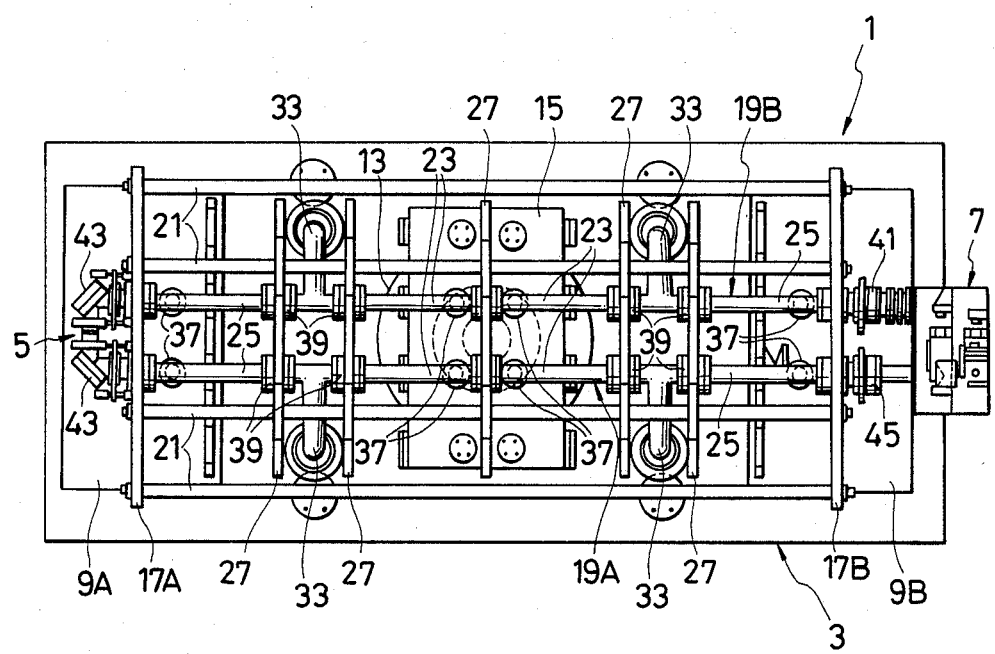
FIG. 2 is a plan view of the previously developed high speed axial flow carbon dioxide gas laser generator.

First, that high speed axial flow carbon dioxide gas laser generator is generally explained, with reference to FIG. 1 and FIG. 2. A high speed axial flow carbon dioxide gas laser generator or oscillator 1 comprises a supporting frame 3, a laser generator section 5 supported on the supporting frame 3, and an attachment 7 which adjusts the laser generator section 5.

A plurality of pedestals 9A and 9B are mounted on the left and right sides respectively of the supporting frame 3, and a main heat exchanger 11 for cooling the laser gas (a mixed gas of carbon dioxide, nitrogen and helium) is mounted in the center. A gas circulation drive device 13, for circulating the laser gas, is provided on the top surface of the main heat exchanger 11. An auxiliary heat exchanger 15, which also cools the laser gas, is provided on the top section of the gas circulation drive device 13.

The laser generating section 5 comprises two groups of laser tubes 19A and 19B, which are supported by a plurality of supporting plates 17A and 17B provided on the top surfaces of the left and right pedestals 9A and 9B in a manner to allow the laser tubes 19A and 19B to move freely in micromotion in the lateral direction. The supporting plates 17A and 17B are integrally linked by four tie-rods 21. In addition, the two groups of laser tubes 19A and 19B are formed respectively from two central shells 23 and two end shells 25. These are supported by five holder plates 27 mounted on the tie-rods 21.

A plurality of laser gas inlets 29, by which the laser gas is fed into the laser tubes 19A and 19B from the auxiliary heat exchanger 15, are provided in four locations. In addition, high temperature laser gas which is discharged from a discharge section 31, is specifically deionized by means of a catalyst provided in an expanded section 35 running through a gas return duct 33. After being cooled in the main heat exchanger, this laser gas is once again fed into the laser tubes 19A and 19B through the auxiliary heat exchanger 15 by means of the gas circulation drive device 13.

A plurality of positive electrodes 37 used for discharge are provided in the laser gas inlets 29 of the laser tubes 19A and 19B, and, in addition, a plurality of negative electrodes 39 are provided on both sides of the discharge section 31. The laser gas is placed in a state of excitation by a discharge between these pairs of electrodes, and the excitation light passes to a rear mirror 41, then to a plurality of bend mirrors 43, and returns to an output mirror 45. This excitation light is amplified and produces the laser oscillation. One part of this oscillation is directed externally by the output mirror 45 and is used for laser processing.

The above is a general explanation of the construction and operation of a previously developed carbon dioxide gas laser generator.

Figure 3:
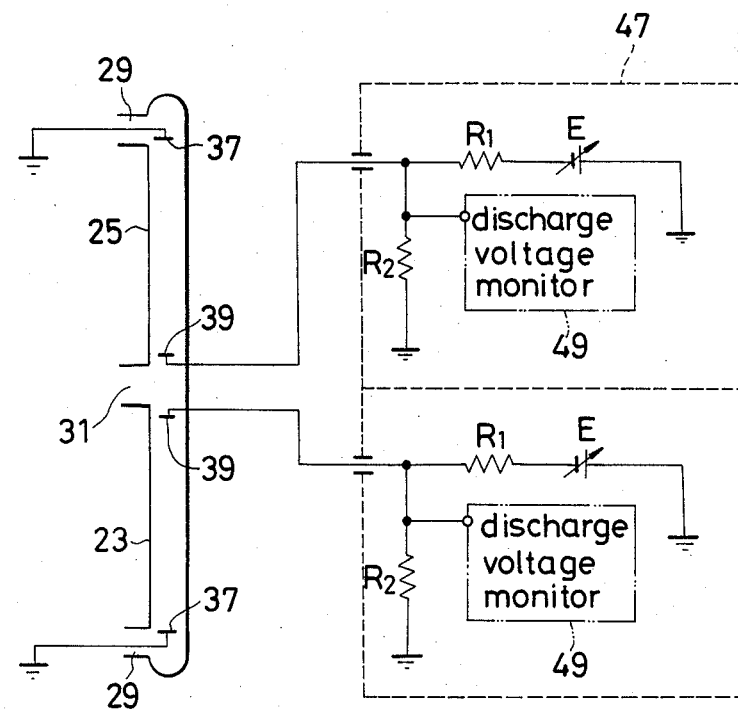
FIG. 3 is a schematic drawing of a discharge circuit and discharge voltage monitor of a previously developed high speed axial flow carbon dioxide gas laser generator.

The laser tubes 19A and 19B, as explained above, are formed from the pair of central shells 23 and the pair of end shells 25 respectively. In these shells, the positive electrodes 37 and the negative electrodes 39 are provided for the discharge, and the discharge is performed by the AC power source at the respective locations. The discharge circuit is shown in FIG. 3. As shown in this drawing, the positive electrodes 37 of the neighboring laser tubes 23 (central shells) and 25 (end shells) are connected to the positive sides of each of a plurality of separately provided variable DC power sources and grounded therewith E. The negative electrodes 39, as explained previously, are provided adjacent to the discharge section 31, and each is respectively connected to the negative side of the DC power source through a ballast resistance R1.

In this discharge circuit, a plurality of discharge voltage monitors 49 monitor the voltage at the negative electrodes through a plurality of detector resistances R2 in order to monitor the discharge status of each of the laser tubes. This type of discharge voltage monitor is provided because the electrical resistances between the two negative electrodes of the laser tubes differ in the respective laser tubes, and when the difference in electric potential becomes large, a discharge is produced between the two negative electrodes so that the laser oscillation becomes unstable, causing the output to drop, which must be prevented.

This discharge voltage monitoring device detects and indicates the negative electrode voltage of each of the laser tubes respectively. When the difference between these voltages is large, a specified operation is carried out, either by an operator, or automatically. However, when a discharge is produced between two negative electrodes for example, the electric potential between the two negative electrodes will change to become smaller. In such a case, it is not possible to conclude from the monitor indication that there is an abnormality. Accordingly, this discharge voltage monitoring device will not necessarily indicate clearly the discharge status of the laser tube.

Figure 4:
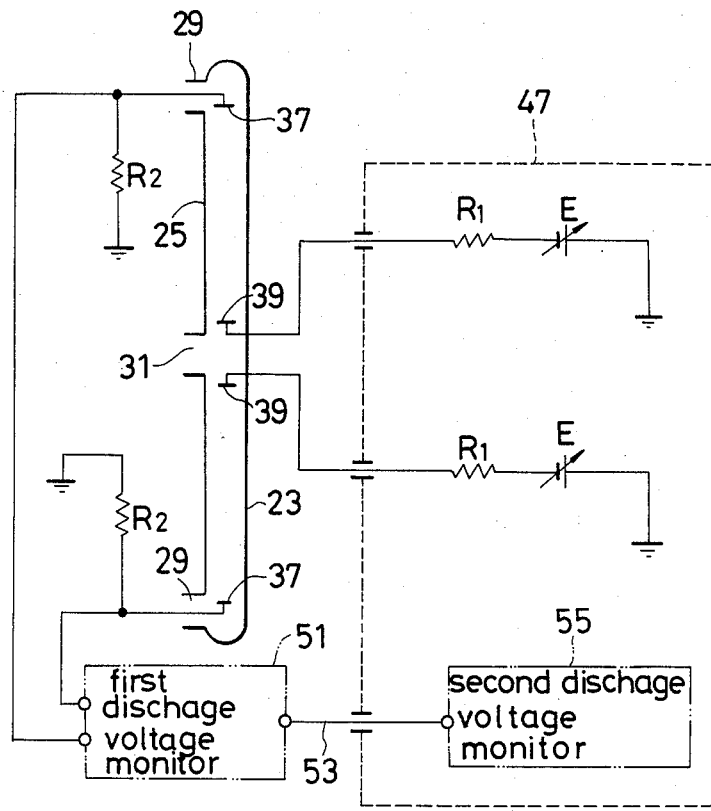
FIG. 4 is a schematic drawing of an embodiment of the present invention.

Next, an embodiment of the present invention will be explained with reference to the drawings. Referring to FIG. 4, one embodiment of the present invention is shown. Specifically, a plurality of laser tubes 23 and 25, of identical length and diameter, provided with a positive electrode 37 and a negative electrode 39, are positioned in series. The positive electrode 37 of each laser tube is insulated and grounded through a detection resistance R2. The negative electrodes 39 are individually connected to the negative side of a variable voltage DC power source E through a ballast resistance R1, and the positive side of the power source is grounded to form the discharge circuit.

Figure 5:
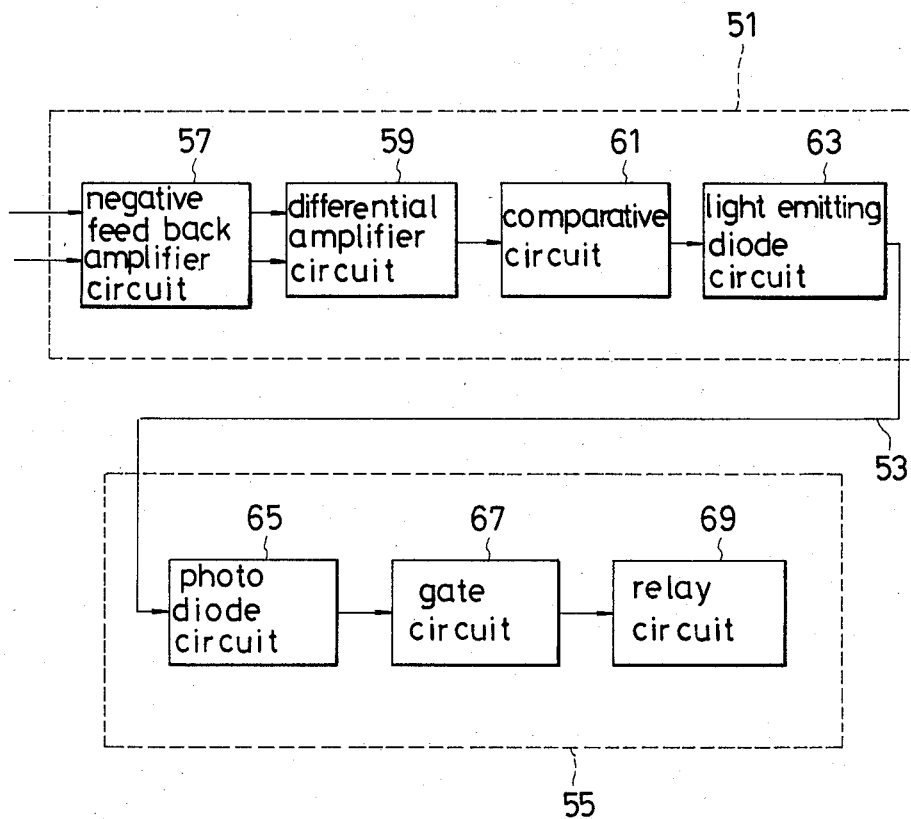
FIG. 5 is a schematic drawing of an embodiment of a discharge voltage monitor.

The positive electrodes 37 of each of the laser tubes are connected to a first discharge voltage monitor 51. The output of the discharge voltage monitor 51 is input to a second discharge voltage monitor 55 through an optical fiber cable 53. A block 47, which is outlined by the dotted lines, is the power source section. The second discharge voltage monitor 55 is installed in this section. Because the discharge voltage monitor is divided into two parts, the second discharge voltage monitor 55 formed from low-voltage logic elements is little influenced by noise. The first discharge voltage monitor 51 is the abnormal voltage detection section, comprising, as shown in FIG. 5, a negative feedback amplifier circuit 57, a differential amplifier circuit 59, a comparative circuit 61 which compares the voltage differential between the two positive electrodes with the standard value, and a light emitting diode (LED) circuit 63 which converts the output of the comparative circuit 61 to light. The light produced by this LED is transmitted to the second discharge voltage monitor 55 through the optical fiber cable 53. The second discharge voltage monitor 55 is the operating section, and comprises a photodiode circuit 65 which changes light into photoelectric current and converts the photoelectric current to voltage, a gate circuit 67 which is activated by a select or warning reset instruction from the laser tube being monitored, and a relay circuit 69 which outputs the warning or other action instruction.

In this configuration, almost identical DC voltages are applied to each laser tube and a discharge is generated. A laser oscillation occurs, but, as previously outlined, the electrical resistance of the laser gas differs at each laser tube, so that the discharge status of each is not identical. Accordingly, a difference is produced in the positive electrode voltages. This voltage difference is detected in the first discharge voltage monitor 51. In the case where the standard value is exceeded, a stipulated action is performed by the second discharge voltage monitor 55, such as, for example, a warning, or an instruction to increase or decrease the voltage of the power source.

In operation, the voltage is detected at the positive electrode of each of the laser tubes. Accordingly, because the discharge current of the laser tubes is clearly obtained from the detected positive electrode voltage and the detector resistance regardless of the presence or absence of a discharge between adjacent negative electrodes, the discharge status of each of the laser tubes can be accurately determined. Because there are many cases where a discharge between negative electrodes is produced, when a large positive electrode voltage difference is detected at adjacent laser tubes, the monitor which monitors the status of the discharge will operate in the case where the detected positive electrode voltage difference is larger than a standard value, and a specified action, for example, an alarm, is performed.

As can be understood from the above explanation, this invention is able to provide a device for monitoring the discharge voltage of a laser generator which is capable of more accurate detection and monitoring of abnormal discharges between adjacent negative electrodes by detection of the voltage difference between the positive electrodes of the laser tubes.

Although a preferred form of the present invention has been illustrated and described, it should be understood that the device is capable of modification by one skilled in the art without departing from the principles of the invention. Accordingly, the scope of the invention is to be limited only by the claims appended hereto.

What I claim is:

1. A device for monitoring the discharge voltage of a laser generator comprising:

a plurality of laser tubes positioned in series, each said laser tube containing a positive and negative electrode, wherein said positive electrode is grounded through a detector resistance and said negative electrode is connected to the negative side of a DC power source through a ballast resistance with the positive side of the DC power source grounded; and a monitor means connected to each positive electrode for detecting differences in voltage between the neighboring laser tubes at each said positive electrode to monitor the discharge of the generator.

2. The device of claim 1, wherein said monitor means comprises a first monitor to detect the voltage at the positive electrode and a second monitor connected to said first monitor in series for a predetermined operation.

3. The device of claim 2, wherein said first monitor has a light emitting diode circuit for output, said second monitor has a photodiode circuit for input, and said light emitting diode circuit and photodiode circuit are connected to each other through an optical fiber.

4. The device of claim 2, wherein said predetermined operation is a warning.

5. The device of claim 2, wherein said predetermined operation is a change in power source voltage.

6. The device of claim 2, wherein said first monitor comprises a negative feed back amplifier circuit, a differential amplifier circuit, a comparative circuit and a light emitting diode circuit.

7. The device of claim 6, wherein said second monitor comprises a photodiode circuit, a gate circuit and a relay circuit.

8. The device of claim 7, wherein said predetermined operation is a warning.

9. The device of claim 7, wherein said predetermined operation is a change in power source voltage.

* * * * *